(12) United States Patent
Lewis

(10) Patent No.: US 7,397,367 B1
(45) Date of Patent: Jul. 8, 2008

(54) HIDEABLE TRACKING MONITOR

(76) Inventor: Michael Lewis, 2512 Gibbs Ave. NE., Canton, OH (US) 44714

( * ) Notice: Subject to any disclaimer, the term of this patent is extended or adjusted under 35 U.S.C. 154(b) by 270 days.

(21) Appl. No.: 11/237,253

(22) Filed: Sep. 29, 2005

(51) Int. Cl.
*G08B 1/08* (2006.01)

(52) U.S. Cl. .............................. 340/539.15; 340/539.1; 340/539.11; 340/539.13; 340/573.1

(58) Field of Classification Search .............. 340/539.1, 340/539.11, 539.13, 539.14, 539.15, 539.23, 340/573.1
See application file for complete search history.

(56) References Cited

U.S. PATENT DOCUMENTS

| | | | |
|---|---|---|---|
| 4,598,275 A | 7/1986 | Ross et al. | |
| 4,814,751 A | 3/1989 | Hawkins et al. | |
| 5,448,221 A | 9/1995 | Weller | |
| 5,525,967 A | 6/1996 | Azizi et al. | |
| 5,742,233 A * | 4/1998 | Hoffman et al. | 340/573.1 |
| 5,828,306 A | 10/1998 | Curran | |
| 5,905,461 A | 5/1999 | Neher | |
| 5,936,529 A | 8/1999 | Reisman et al. | |
| 5,939,988 A | 8/1999 | Neyhart | |
| 6,014,080 A | 1/2000 | Layson, Jr. | |
| 6,166,642 A | 12/2000 | Farshid | |
| 6,169,484 B1 | 1/2001 | Schuchman et al. | |

* cited by examiner

*Primary Examiner*—Daryl C Pope
(74) *Attorney, Agent, or Firm*—John D. Gugliotta

(57) ABSTRACT

A hideable tracking monitoring apparatus is provided for communicating the presence of an emergency to a monitoring station. The monitoring station then triangulates the location of the emergency signal and alerts an emergency response vehicle.

3 Claims, 4 Drawing Sheets

HIDEABLE TRACKING MONITOR

RELATED APPLICATIONS

There are no other previously filed, nor currently any pending applications, anywhere in the world.

BACKGROUND OF THE INVENTION

1. Field of the Invention

The present invention relates generally to tracking and emergency signaling devices and, more particularly, to a personal safety signaling apparatus and system capable of being difficult to detect upon a child.

2. Description of the Related Art

According to the National Incidence Studies of Missing, Abducted, Runaway and Thrown-away Children there are nearly 800,000 children reported missing each year (more than 2,000 per day). 58,200 children are abducted by non-family members. 115 children are the victims of the most serious, most long-term abductions (stereotypical kidnappings), of which 56% are recovered alive, 40% are killed. 203,900 children are the victims of family abductions.

There is a fairly broad awareness of this issue and a number of programs have been set up to assist in finding missing children by enlisting the help of the public. One such program is the AMBER alert system supported by the National Center for Missing & Exploited Children (NCMEC).

The AMBER plan was created in 1996 as a powerful legacy to 9-year-old Amber Hagerman, who was kidnapped and murdered in Arlington, Tex. Credited with saving 31 lives since its inception, AMBER Alerts are currently transmitted over broadcast medium to licensed television and radio stations, and cable systems using the Emergency Alert System (EAS). The EAS, operated by the Federal Communications Commission (FCC), is primarily used to issue severe weather alerts and for other emergency purposes. AMBER Alerts are also transmitted via electronic highway billboard signs in select areas.

There is also an online AMBER Alert systems such as the "AOL AMBER Alerts", program which utilizes the Internet to expand the broadcast network that helps locate and rescue abducted children. AOL announced that 62 of the 63 states, counties and cities that currently have AMBER Alert systems in place (as of Sep. 30, 2003) have agreed to participate in the AOL AMBER Alerts program. As a result, official AMBER Alerts texts as issued by law enforcement, will be available as an "opt-in" feature beginning in early November 2003, and will be targeted to members based on the states in which they reside. The texts will run over the new "AOL Alerts & Reminders" product, which will allow members to choose to receive the alerts immediately on their computer screens, via email, mobile phones, or paging devices.

The AMBER Alert system goes through local law enforcement agencies and the information must be verified before broadcasting to all media outlets so as not to waste these valuable resources which are generously given to help the few children who are in true danger by their abductors. The process of vetting out improper claims and getting all of the information necessary to go on the air with the amber alert can generally take several hours. This time frame is too slow in the context of finding a missing child where a few hours or less may be all the time they have left. The Amber Alert system must be selective since it commits a large amount of broadcast resources for a few days. The AMBER Alert system is a great augmentation to the present invention.

In the related art, many methods for emergency tracking and rescue signaling are known. For example, the following patents disclose various monitoring and tracking systems:

U.S. Pat. No. 5,905,461, issued in the name of Neher;
U.S. Pat. No. 5,936,529, issued in the name of Reisman et al.;
U.S. Pat. No. 5,48,221, issued in the name of Weller;
U.S. Pat. No. 5,828,306, issued in the name of Curran;
U.S. Pat. No. 4,814,751, issued in the name of Hawkins et al.;
U.S. Pat. No. 4,598,275, issued in the name of Ross et al.;
U.S. Pat. No. 5,939,988, issued in the name of Neyhart;
U.S. Pat. No. 5,936,529, issued in the name of Reisman et al.;
U.S. Pat. No. 6,014,080, issued in the name of Layson, Jr.;
U.S. Pat. No. 6,166,642, issued in the name of Farshid;
U.S. Pat. No. 6,169,484 B1, issued in the name of Schuchman et al.; and
U.S. Pat. No. 5,525,967, issued in the name of Azizi et al.

Further, the following patents describe an emergency signaling unit and alarm system designed to be carried on the person: U.S. Pat. No. 4,998,095 issued in the name of Shields; U.S. Pat. No. 4,468,656 issued in the name of Clifford et al; U.S. Pat. No. 4,121,160 issued in the name of Cataldo; and, U.S. Pat. No. 5,894,591 issued in the name of Tamayo discloses a personal emergency response communication apparatus for pagers.

Also, U.S. Pat. No. 5,335,246 issued in the name of Yokev et al. describes a pager with reverse paging facility and a mobile receiver.

And again, U.S. Pat. No. 4,467,142 issued in the name of Rupp et al. discloses an automatic dialing system for transmitting emergency calls from persons requiring assistance.

Consequently, a need has been felt for providing an apparatus and method which overcomes provides effective, location specific signaling and emergency tracking in a portable manner.

SUMMARY OF THE INVENTION

It is therefore an object of the present invention to provide an improved personal emergency signaling device.

It is a feature of the present invention to provide an improved personal emergency signaling device that is small in nature and designed to be unnoticed, or hideable, when placed with a child.

Briefly described according to one embodiment of the present invention, a very small transmitter is provided in a tracking device which sends signals to a GPS satellite system. The GPS satellite system sends signals to a conventional GPS receiver. Communications between the tracking device and the GPS satellite system is facilitated via a wireless communication link. The tracking device is envisioned to be incorporated in a concealed manner in a variety of children's articles such as hair ties, shoes, backpack, and clothing. Reporting and alarming of the child's whereabouts can then be done in an otherwise conventional manner.

Advantages of the present invention allow the emergency signaling device to track the user anywhere in the world.

It is envisioned that the concealable nature of the transmitter can provide an effective tracking device for use in protecting small children from being lost or abducted.

Further, the present invention can interface with existing tracking systems and existing reporting/alarming systems already in use for finding lost or abducted children.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
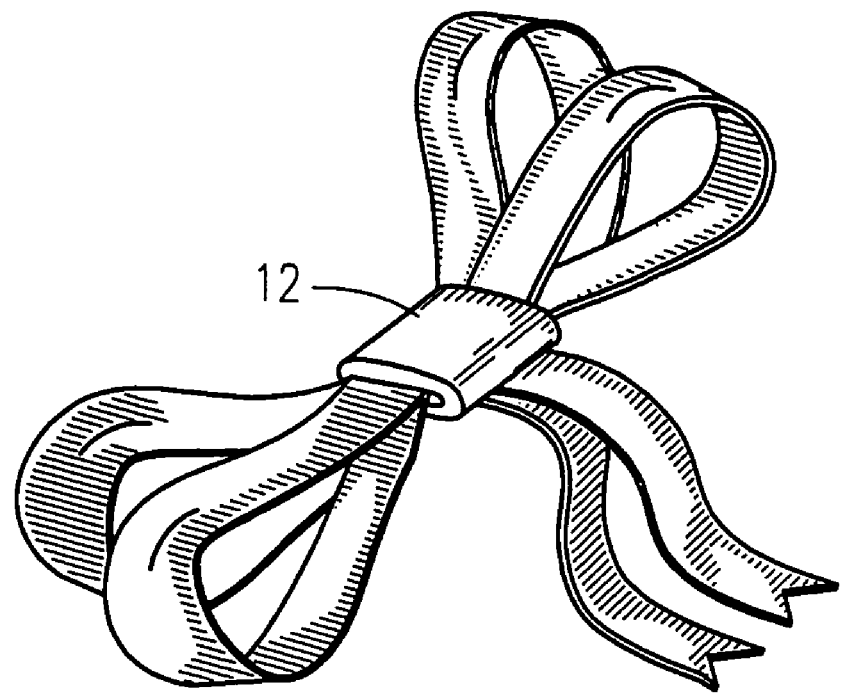
FIG. 1 is a perspective view of the hideable tracking monitor apparatus according to a preferred embodiment of the present invention shown concealed in a hair ribbon 10.
Figure 2:
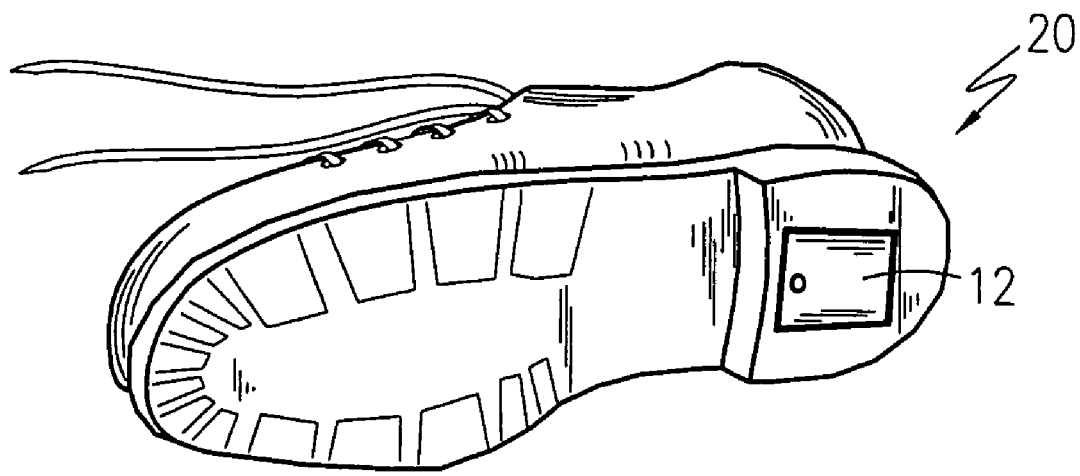
FIG. 2 is a perspective view of the hideable tracking monitor apparatus as shown provided concealed in a shoe 20 according to first alternate embodiment of the present invention.
Figure 3:
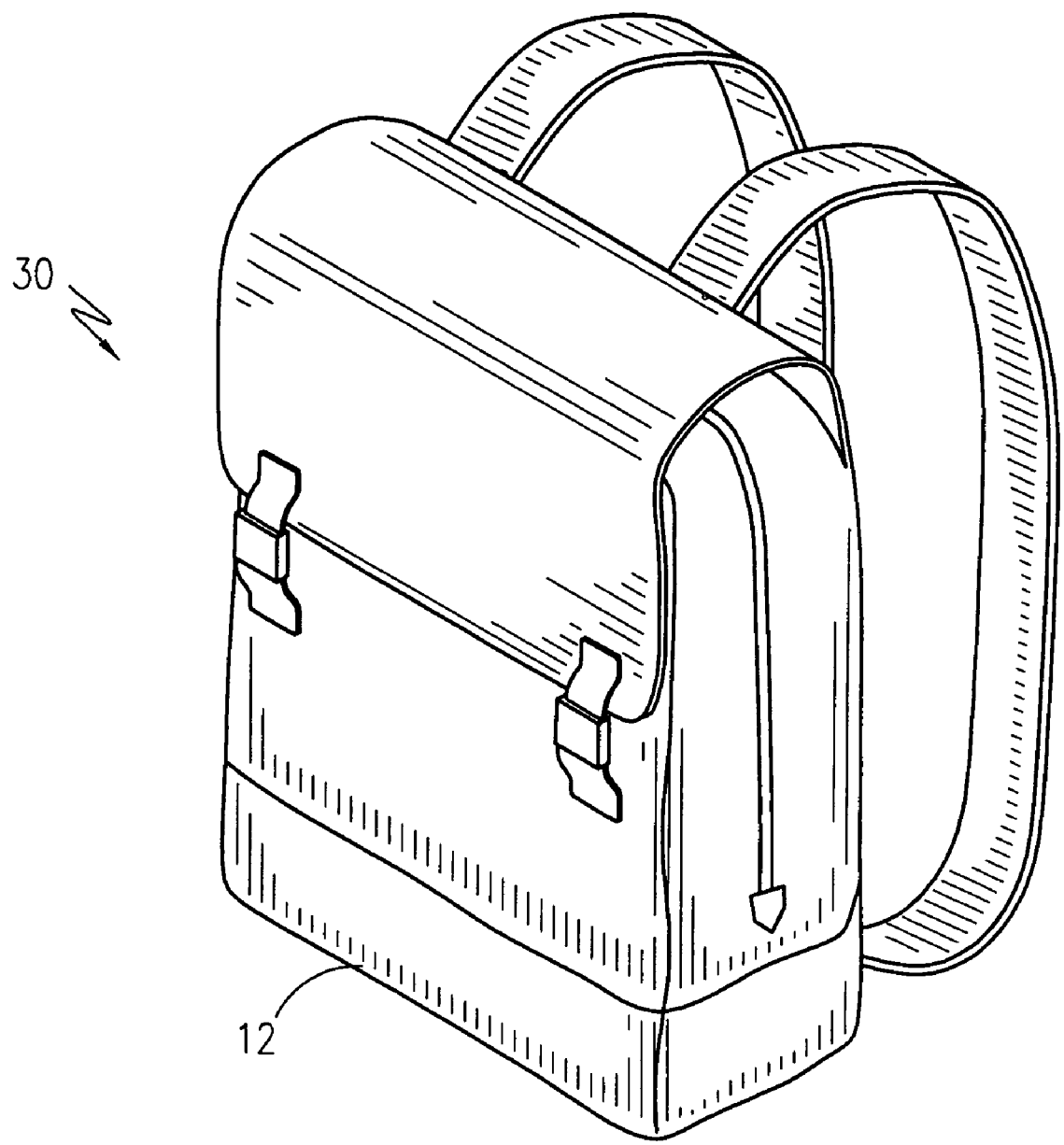
FIG. 3 is a perspective view of a hideable tracking monitor apparatus as shown concealed in a backpack 30 according to second alternate embodiment of the present invention.

Referring now to FIGS. 1-3, a hideable tracking monitor apparatus is disclosed shown according to a number of exemplary embodiment of the present invention, in which a very small transmitter 12 is incorporated in a concealed manner in a variety of children's articles such as hair ties 10, shoes 20, or backpacks 30. These embodiments are shown as an example for purposes of disclosure, and are not intended to be limiting in that it is envisioned that a number of other concealment elements, such as various elements of clothing, can be similarly used. In each case, the transmitter 12 is provided as a tracking device which sends signals to a GPS satellite system. The GPS satellite system sends signals to a conventional GPS receiver. Communications between the tracking device and the GPS satellite system is facilitated via a wireless communication link. The tracking device is envisioned to be incorporated in a concealed manner in order to minimize the detection of the transmitter 12. Reporting and alarming of the child's whereabouts can then be done in an otherwise.

In all embodiments, the transmitter 12 is enclosed in an enclosure, envisioned to be of high impact plastic. Continuous transmitting is anticipated as being provided to prevent unintentional deactivation under emergency situations. It is envisioned that these emergency situations could include range from an assault, to a theft, a rape, gunfire, a fire, severe weather conditions, sudden illnesses and the like. Located on the top of the enclosure is an antenna for use in transmitting the associated wireless signals. The overall size of the tracking monitor apparatus 10 is envisioned to be approximately that the smallest cellular telephone. The current technology as used with the tracking monitor apparatus is currently envisioned to be that of cellular technology due to size, weight, and power requirements, but it should be assumed that other, newer, digital technologies currently under development and those to be used in the future could also be used with the preferred embodiment of the present invention, and as such, should not be interpreted as a limiting factor. All of the alternate embodiments as depicted in FIGS. 1-3 are currently within range of VSLI production, and as the reception and receiving station infrastructure of both analog and digital wireless networks are built up, the use of such alternate embodiments anywhere on the earth's surface will be possible.

Figure 4:
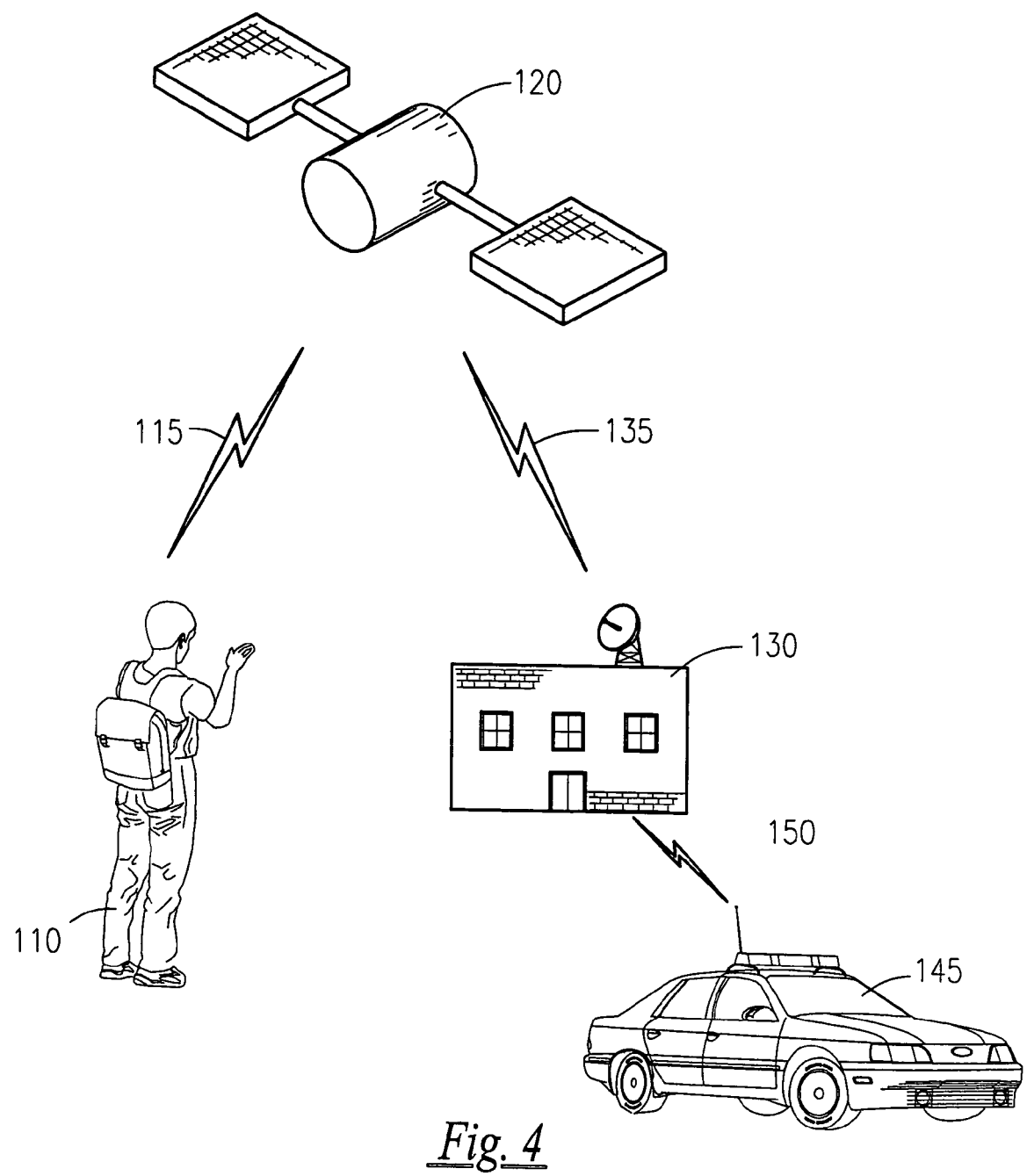
FIG. 4 is a pictorial representation of the wireless radio frequency link as used with the hideable tracking monitoring apparatus 10.

Referring now to FIG. 4, a pictorial representation of the tracking monitor apparatus is depicted. A user 110 is equipped with a hideable tracking monitoring apparatus 10 as shown. The hideable tracking monitoring apparatus transmits first wireless link 115, anticipated as an otherwise standard GPS signal as required by FCC regulations, to a satellite receiver 120. The emergency signal then continues to a central monitoring station 130 via a second wireless link 135. The central monitoring station 130 then alerts an emergency response vehicle 145 via a conventional alerting method 150 such as VHF or UHF communications. Such technology would be used in an unaltered state with the current invention to determine location and, as such, in addition to be supplied with the nature of the emergency, the emergency response vehicle 145 is also supplied with the location of the emergency. The hideable tracking monitor 10 is capable of being adapted to coordinate data from a reference source such as the Loran system or the like.

Figure 5:
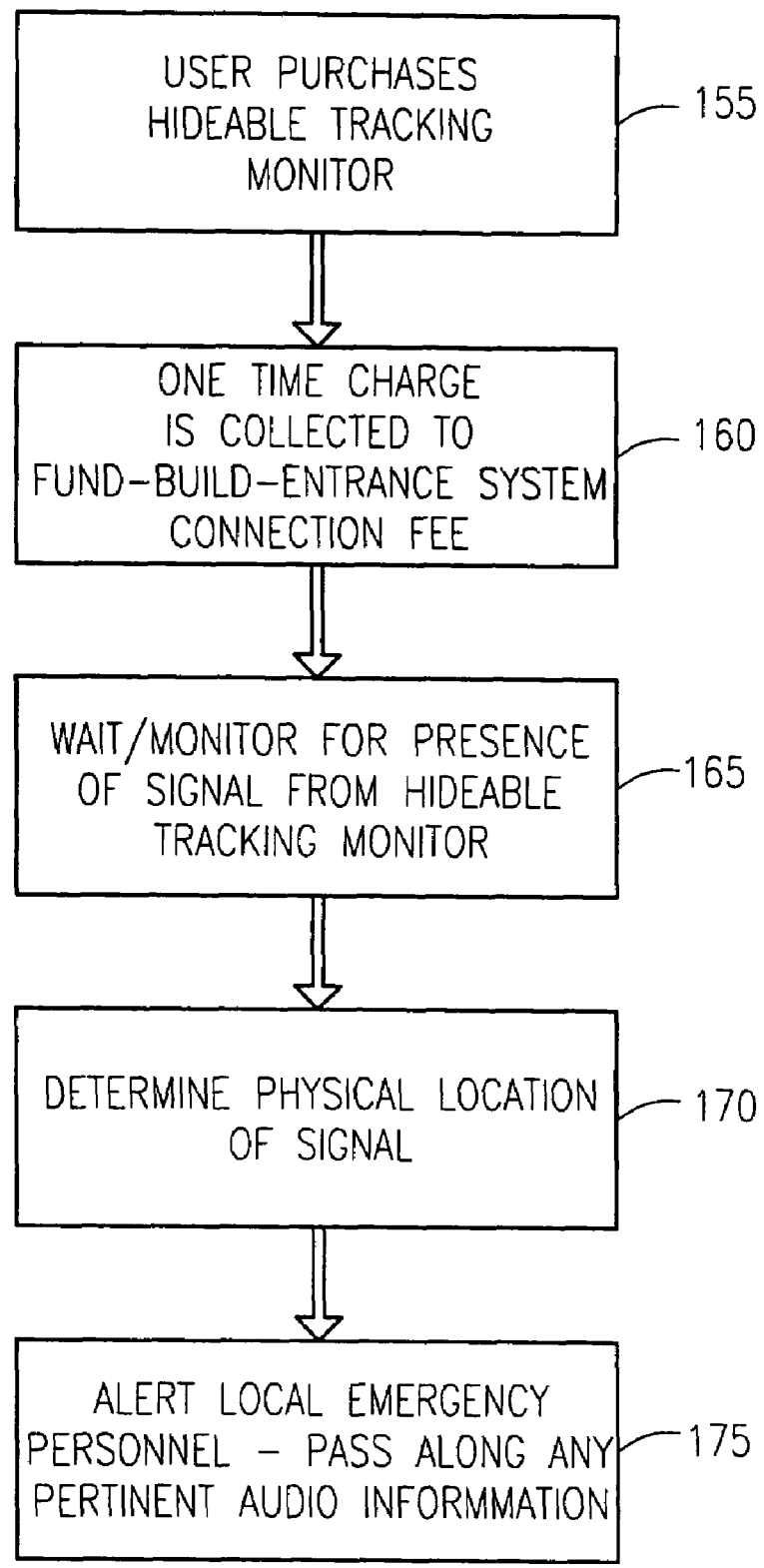
FIG. 5 is a flow diagram depicting the event sequence that occurs when purchasing, activating and using a hideable tracking monitoring apparatus 10.

Referring finally to FIG. 5, a flow diagram depicting the event sequence that occurs when purchasing, activating and using a hideable tracking monitor 10 is disclosed. The sequence begins at a first functional block 155 where the user decides which physical embodiment or decorative element will be used to hide the monitor 10 (not shown in this FIG.) is desired. Also occurring during the first functional block 155 is the purchase of the hideable tracking monitor 10 (not shown in this FIG.) itself. This purchase is for the electronic device depicted by the enclosure 15 (as shown in FIGS. 1-3) or similar devices as shown in FIGS. 1-3. This is a one time purchase and will not need to be repeated for the life of the device. At a second functional block 160 the user also pays a connection or service fee to allow access to the system. At this point the user is activated and ready to utilize the hideable tracking monitor 10 (not shown in this FIG.) for any emergency. At a third functional block 165, the central monitoring station 130 (as shown in FIG. 5) begins the monitoring process. The process remains at the third functional block 165 indefinitely. Should an emergency exist, the process continues to a fourth functional block 170. It is at the fourth functional block 170, that the location of the emergency along with the nature of the emergency is determined. The location is determined by satellite global position system as aforementioned described. At this point the knowledge gained about the emergency is passed to the pertinent emergency personnel at a fifth functional block 175 who respond to the scene in a conventional manner as would be used during any other emergency request such as those identified by conventional telephones, cellular telephones, amateur radio, automatic alarm systems and the like.

2. Operation of the Preferred Embodiment

The preferred embodiment of the present invention can be used by the common user in a simple and effortless manner. To use the present invention, hideable tracking monitor 10 is provided on the child to be guarded. The device is 'hidden in plain sight' and is afforded its undetectablity by the nature of its appearance, which is discourages accidental or unauthorized removal of the transmitter. This allows for safety tracking of the transmitter wearer both within a building as well as within a reasonable outdoor proximity of the care giver.

Should the wearer become completely lost, a global positioning system transponder allows the use of a separate locator either used by the care giver or a central monitoring agency to locate the wearer of the wrist mounted tracking transmitter.

As designed, a device embodying the teachings of the present invention is easily applied. The foregoing description is included to illustrate the operation of the preferred embodiment and is not meant to limit the scope of the invention.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A hideable tracking monitoring apparatus comprising:
   a small transmitter is provided in a tracking device which continuously transmits a first signal to a GPS satellite system, a satellite receiver continuously uses said first signal to transmit a second signal to a central monitoring station, said central monitoring station continuously monitors said continuous transmissions for a service fee; and
   an ornamentally disguised outer housing for retaining said transmitter, said outer housing is designed to be concealable moveable and hideable under a child's clothing such as to be undetected by both a child or an abductor when said housing is placed with a child.

2. The hideable tracking monitoring apparatus of claim 1, wherein said transmitter communicates between said tracking device and the GPS satellite system via a wireless communication link.

3. The hideable tracking monitoring apparatus of claim 1, wherein said ornamentally disguised outer housing is designed to appear similar to and worn similar to those articles is selected from the group comprising hair ties, and clothing.

* * * * *